(12) United States Patent
Nishimura

(10) Patent No.: US 7,051,965 B2
(45) Date of Patent: May 30, 2006

(54) PAINT-COATED COMPONENTS

(75) Inventor: Yasushi Nishimura, Izumi (JP)

(73) Assignee: Shimano Inc., Osaka (JP)

( * ) Notice: Subject to any disclaimer, the term of this patent is extended or adjusted under 35 U.S.C. 154(b) by 464 days.

(21) Appl. No.: 09/986,977

(22) Filed: Nov. 13, 2001

(65) Prior Publication Data

US 2002/0104911 A1 Aug. 8, 2002

(30) Foreign Application Priority Data

Nov. 30, 2000 (JP) .............................. 2000-364472

(51) Int. Cl.
*A01K 89/15* (2006.01)

(52) U.S. Cl. ..................... 242/310; 242/223; 428/334; 428/471.1

(58) Field of Classification Search ................ 428/334, 428/471.1, 471.2; 242/310, 311, 312, 313
See application file for complete search history.

(56) References Cited

U.S. PATENT DOCUMENTS

| 4,180,448 A | 12/1979 | Soshiki et al. |
| 4,369,225 A | 1/1983 | Manabe et al. |

FOREIGN PATENT DOCUMENTS

| JP | 02038160 A | 2/1990 |
| JP | 11-206284 A | 8/1999 |
| JP | 2001-17040 A | 1/2001 |

*Primary Examiner*—Kathy Matecki
*Assistant Examiner*—Evan H. Langdon
(74) *Attorney, Agent, or Firm*—Shinjyu Global IP; Counselors, LLP

(57) ABSTRACT

A dual-bearing reel component, whose obverse face is paint-coated, is furnished with: a base element, a ground coating formed by painting on an obverse-layer side of the base element, and a metallic coating layer having a mirroring effect and formed semitransparently on an obverse-layer side of the ground coating. The paint-coated component of the present invention improves the design of paint-coated components in their outward look.

6 Claims, 4 Drawing Sheets

PAINT-COATED COMPONENTS

BACKGROUND OF THE INVENTION

1. Field of the Invention

The present invention relates to paint-coated components, in particular to outdoor-use paint-coated components such as fishing gear, whose obverse face is coated with paint.

2. Background Information

Paint films formed of paint are often applied onto the obverse face of components of fishing gears, which are often used outdoors. In particular, such paint films are applied to components made of a metal such as magnesium alloy. By forming such paint films onto the body of a component, the body of the component will not be directly exposed to the corrosive atmospheres. Therefore, the corrosion resistance can be improved. Further, the appearance may be improved by forming the paint films from paints of assorted colors.

The component body in the foregoing conventional paint-coated components is completely concealed by the paint film in a normal case in which the paint film is formed by paint such as an acrylic resin paint or a urethane resin paint. Therefore, with paint-coated components manufactured from metals such as magnesium alloy, while paint films can yield iridescent patterns, the outward appearance will not lend the classic look of the metal because the component body is wholly covered by the paint film.

SUMMARY OF THE INVENTION

An object of the present invention is to improve the appearance of paint-coated components.

A paint-coated component a component whose surface is paint-coated and is furnished with: a component body; a ground film-layer formed by a paint coat on an obverse-layer side of the component body; and a metal film or means layer having a mirroring effect and formed semitransparently on an obverse-layer side of the ground film-layer.

In this paint-coated component, a ground film-layer is formed from paint on a component body made of a synthetic resin or a magnesium alloy. On the upper layer, a semitransparent metal film layer is formed by a metal-vapor deposition, by adjusting a metal having a semitransparent mirroring effect with a half-transparency. Herein, to "adjust the metal with a half-transparency" means to vary the proportion of the ground film-layer that is masked, by adjusting the thickness of the metal film layer. In this case, adjusting the proportion as one of 50%, 25%, 15% and 5%—i.e., making the ground film-layer masking rate to be one of the aforementioned proportions—is preferable, since the light can pass through the metal film layer, and the ground film-layer can be visually recognized. Herein, in a certain position, the light is reflected on the ground coating, showing the tone of the paint, while in another position the light is reflected on the metal film layer due to the half-mirroring effect, showing a metallic mirrored surface with the hue of the ground coating. In this manner, the ground coating yields iridescent patterns, and the metal film layer yields a metallic mirrored surface, improving the appearance of the design.

Preferably, in a paint-coated component, the metal film layer is a film formed by metal vapor deposition, and contains any one of chrome, nickel, zinc, magnesium, aluminum, a stainless steel alloy, and titanium. In this case, because the metal film layer is formed by a metal-vapor deposition method such as ionic plating, or sputtering, an extraordinarily hard, thin coat results. Further, adjusting the metal with a half-transparency improves adherence of the paint in the ground film-layer, and makes an inter-laminar peeling unlikely to occur.

Here, chrome, nickel, zinc, magnesium, aluminum, a stainless steel alloy, and titanium are all metals which have a striking half-mirroring effect. For instance, with titanium oxide, zinc sulfide and magnesium fluoride, which have hues that vary depending on the film thickness, rainbow effects can be generated by making them into a multi-laminar film, further improving the appearance of the design.

Preferably, in a paint-coated component, the metal film layer is formed by sputtering. In this case, since the metal film layer is formed by sputtering, which is a method in which a cationic metal is spewed forth by positive ions, an extraordinarily hard and thin coating can be formed.

Preferably, in a paint-coated component, the metal film layer is formed by ionic plating. In this case, because the metal film layer is formed by ionic plating, which is a method in which a portion of vaporized metal particles are ionized and bonded onto the surface together with other neutral particles, an extraordinarily hard, thin coating can be formed.

Preferably, a paint-coated component further includes a protective film layer formed by a clear paint coat on an obverse-layer side of said metal film layer. In this case, the metal film layer can be protected by applying, e.g., an acrylic resin pain or an ultraviolet-curing resin paint.

Preferably, in a paint-coated component, the component body is formed from at least one of an aluminum alloy and a magnesium alloy. The component body further includes an anodized film layer formed in between the component body and ground film-layer by anodizing. In this case, by forming the anodized film layer, corrosion of the component body made of an aluminum or a magnesium alloy is less likely to occur.

Preferably, in a paint-coated component, the component body is utilized in a fishing gear. In this case, the paint film layer on the fishing gear, which is often used outdoors in corrosive atmospheres, is unlikely to get scratched, maintaining the aesthetic appearance. At the same time, the component body is not likely to be exposed directly to corrosive atmospheres. Accordingly, the component body is not apt to be corroded.

These and other objects, features, aspects and advantages of the present invention will become readily apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
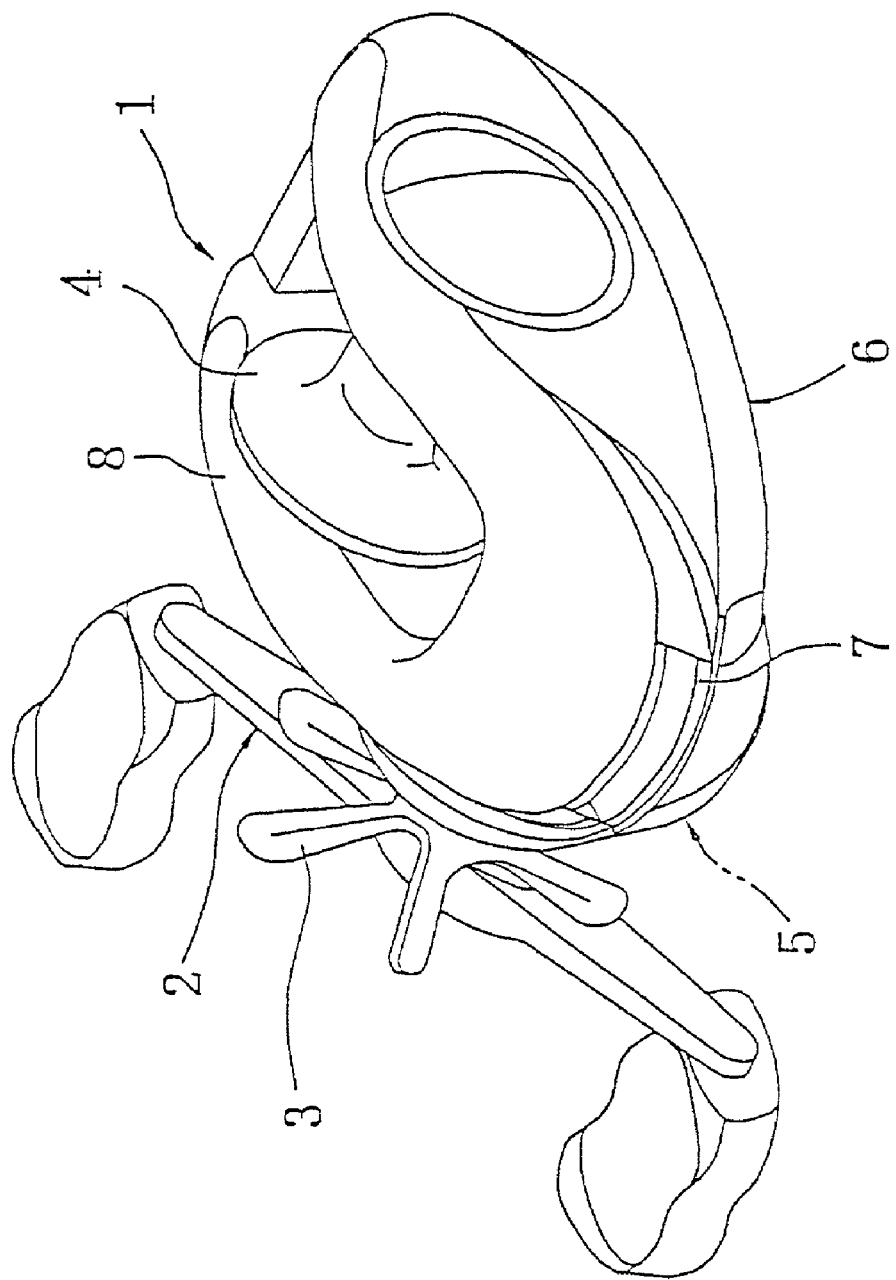
FIG. 1 is a plan view of a dual-bearing reel in accordance with an embodiment of the present invention.
Figure 2:
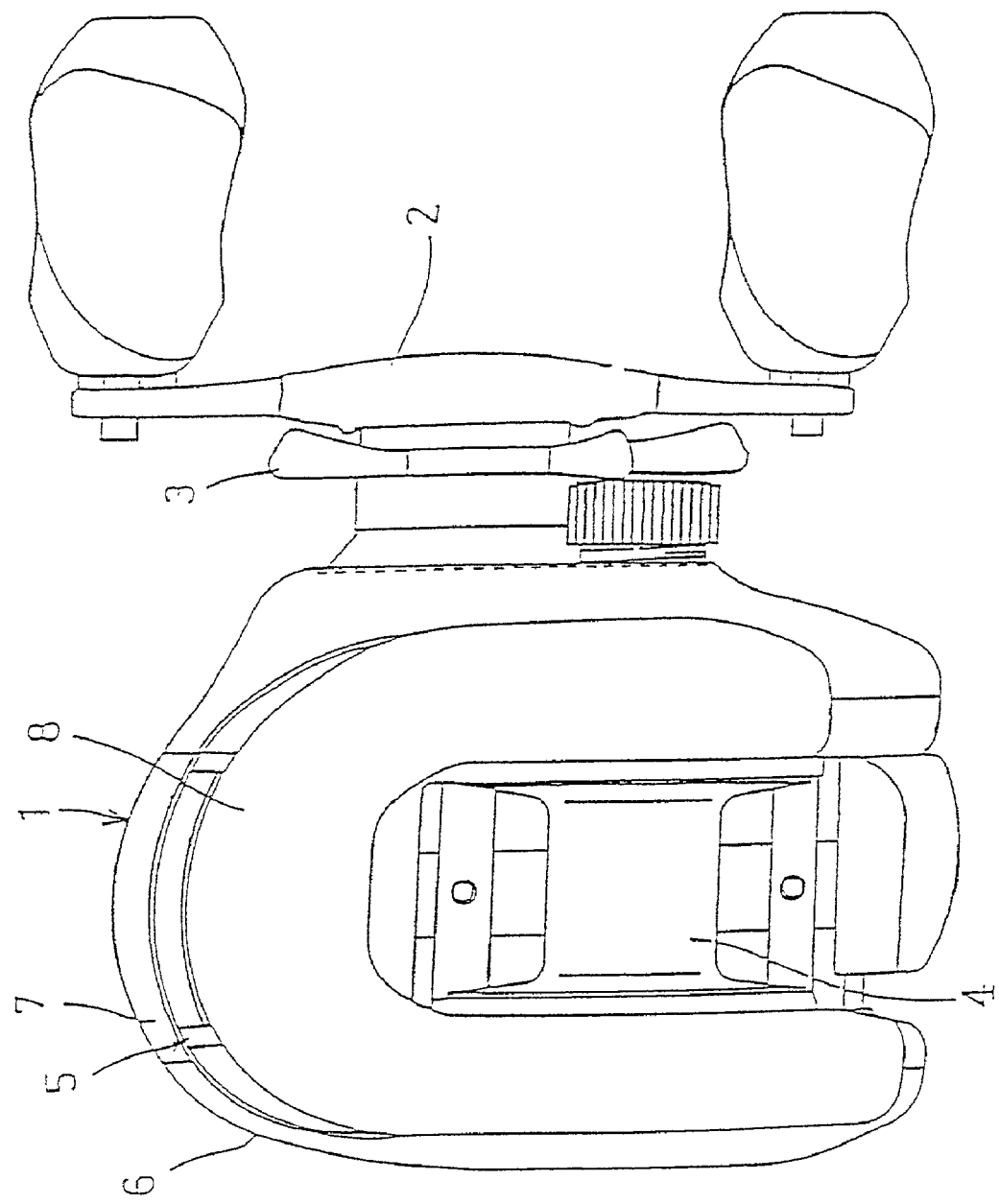
FIG. 2 is a side view of the dual-bearing reel.

A dual-bearing reel in which an embodiment of the present invention is adopted is shown in FIGS. 1 and 2. The dual-bearing reel is a low-profile reel for bait casting. The dual-bearing reel includes a reel body 1 made of a magnesium alloy; a spool-cranking handle assembly 2 disposed on the side of the reel body 1; and a line-winding spool 4 rotatably, removably and reattachably fitted within the reel body 1. A star drag 3 for adjusting drag is provided on the handle-assembly 2 side of the reel body 1.

The reel body 1 includes a frame 5, side covers 6 fitted adjacent the frame 5, a front cover 7 that covers the frame 5 forwardly, and a thumb rest 8 that covers the top. The parts constituting the reel body 1 are manufactured from a metal such as magnesium alloy or aluminum alloy. The obverse faces of the parts are finished with various surface-treating processes.

Next, a detailed explanation will be made regarding the obverse structure of the parts constituting the reel body 1.

Figure 3:
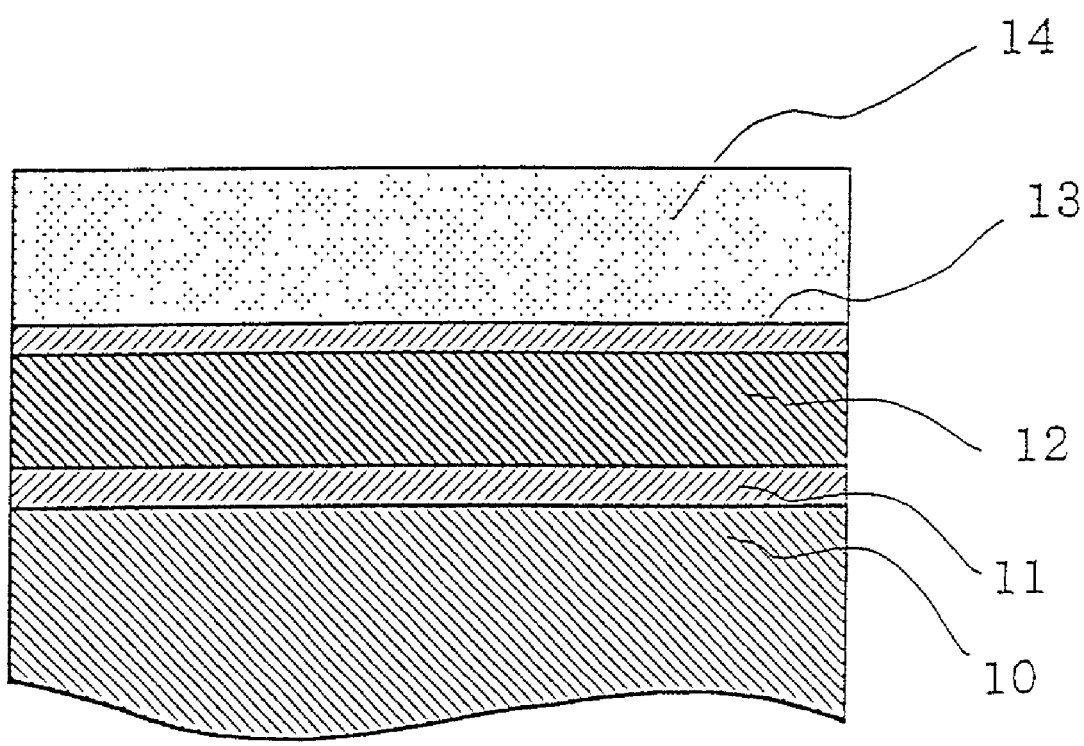
FIG. 3 is an enlarged schematic sectional view of a reel body.

As shown in FIG. 3, an anodized coating layer 11 formed by anodization is provided on the surface of a magnesium-alloy or aluminum-alloy base element 10 of each of the parts. A ground coating 12, formed by metallic paint coating, is built onto the surface of the anodic coating layer 11. A vapor-deposited, semitransparent metal-film layer 13 (metal film means) is formed by sputtering a metal such as aluminum on the surface of the ground coating 12. A protective film layer 14 of an ultraviolet-curing resin paint is then provided as the outermost surface layer on the surface of the metal film layer 13.

The anodized coating layer 11 is a ground coating for providing a favorable adhesiveness of the paint on the layer side obverse to the anodized coating layer 11. The anodized coating layer 11 is a coating created by oxygen that is generated on an anode when the magnesium-alloy base element 10 is electrolyzed as the anode in a solution of sulfuric acid, oxalic acid, or chromic acid. The electrical resistance of this anodized coating layer 11 is high, and its resistance to corrosion and abrasion is excellent.

The ground coating 12 is a paint-film layer for providing iridescent patterns on the surface. The ground coating 12 is formed according to a known painting method, such as by an electrodeposition painting, in which a cationic electrodeposition paint having polyamide resin is used as the chief component, or spray painting, in which the paint is applied by spraying with a spray nozzle.

Where electrodeposition is to be carried out, the base element 10 on which the anodized coating layer 11 is formed is dipped in a paint vat. Then, by applying D.C. voltage using the base element 10 as the cathode and the electrode plate onto which the paint layer is furnished as the anode, the paint is coated on electrically. By forming the ground coating 12 in this way by an electrodeposition paint coat method, the paint film can be bonded uniformly onto the surface of the anodized coating layer 11. Furthermore, the rust-preventive properties can be improved.

The metal film layer 13 is formed by sputtering using aluminum as a target and adjusting the film thickness with a half-transparency, varying the proportion of masked portion in the ground coating 12 in between 80% and 5%. In this manner, a metallic film having a semitransparent mirroring effect can be formed. Specifically, in the case of aluminum, if aluminum is masked at a thickness of 700 angstroms or more, the ground coating 12 would be mostly covered, and the pattern on the ground coating 12 cannot be seen. If the film thickness is 600–50 angstroms, the metal film will be semitransparent. Particularly, the metal film becomes a mirrored surface having a metallic mirroring effect while the pattern on the ground coating can be seen underneath. The film thickness is adjusted by adjusting the film formation time. The shorter the film formation time, the thinner the film is. Conversely, the longer the film formation time, the thicker the film is.

The thickness by which a mirroring effect is yielded varies depending upon the type of paint in the ground coating 12. In cases where the ground coating 12 is metallic paint, for example, even though the metal film layer 13 is layered to the same film thickness, the conditions under which the mirroring effect occurs will differ between the case where coarse metallic powder is utilized and a case where fine metallic powder is utilized. The film thickness of the metal film layer 13 is therefore not limited to the aforementioned 600–50 angstroms range. Further, the film thickness that will bring out a semitransparent mirroring effect will differ depending on the type of metal used as the target.

The protective film layer 14 is formed of, for instance, an ultraviolet-curing, unsaturated polyester resin paint. Because the protective film layer 14 cures uniformly in a brief period of time, its abrasion resistance is improved. Moreover, due to the protective film layer 14's leveling effect of flattening unevenness in the texture, the protective film layer 14 further intensifies the metallic sheen of the metal film layer 13. Here, because the protective film layer 14 is a transparent, clear paint film layer, the sheen of the metal film layer 13 shows through on the outer surface.

The handle assembly 2, the star drag 3, and the spool 4 are each made of either a magnesium alloy or an aluminum alloy. On their obverse faces, the anodized coating layer 11 formed by anodization is provided onto the surface of the base element 10 for each of the metal-manufactured parts. The ground coating 12 is formed on the surface of the anodized layer 11; and the metal film layer 13 and the protective film layer 14 are formed onto the ground coating 12.

Thus, as far as the surface structure of the parts forming the reel body is concerned, the anodized coating layer 11 is formed on the surface of the base element 10 made of metal. The ground coating 12, the metal film layer 13, and the protective coating layer 14 are then formed on top of the anodized coating layer 11. Because the anodized coating layer 11 is formed in between the magnesium alloy base element 10 and the aluminum alloy metal film layer 13, a direct contact of two different kinds of metal, namely between the magnesium alloy and aluminum alloy, is not likely to occur. This accordingly suppresses formation of localized electric cells in the magnesium alloy and aluminum alloy, and makes corrosion of the magnesium alloy base element 10 unlikely to occur.

Further, because the film thickness of the metal film layer 13 is made thin enough to be semitransparent, ground coating 12 is not wholly masked. Therefore, the colors in the ground coating 12 show under the light reflected by the ground coating 12. Also, at the same time, the light reflected by the metal film layer 13 yields a metallic mirrored surface. Therefore, variously colored patterns are brought out, and meanwhile the metallic mirrored surface is also shown, which improves the design.

OTHER EMBODIMENTS (a) The application of the present invention is not limited to fishing reels. The present invention may be applied to components employed in merchandise principally for outdoor use, such as fishing gear, bicycles, and golf equipment. The present invention is applicable to other fishing products such as fishing rods and cooler boxes. The present invention is also applicable to bicycle related products, including brake devices such as brake levers and brake arms, and transmission devices such as front derailleurs and rear derailleurs; and also to golf components such as golf-club heads and shafts, and to other golf equipment.

(b) In the foregoing embodiment, the base element 10 is made of a metal. However, the base element 10 may be made of a non-metal material such as a synthetic resin. In this case, a metallic mirrored surface can be achieved without utilizing an actual metal, thereby reducing component costs but improving the design.

(c) In the foregoing embodiment, the metal film layer 13 is formed by an aluminum-sputtering method. But other metal-vapor deposition methods such as ionic plating may also be employed. Ionic plating is a method by which a metal is vaporized within a vacuum chamber, the vaporized particles are ionized and plated on a surface of the base material surface together with other neutral particles to form a thin metal film.

Further, instead of aluminum, other metals such as chrome, nickel, zinc, magnesium, stainless steel alloys, and titanium may be utilized to form a metal film layer by a metal-vapor depositing such as sputtering and ionic plating. In particular, a metal film layer of vapor-deposited chrome is an extraordinarily hard, thin coating, which therefore improves abrasion resistance. Chrome is also superior in resistance to corrosion. Furthermore, because chrome has a metallic sheen, it also improves the appearance of the metal film.

(d) The protective film layer is not limited to a transparent and clear film, but may also be tinted.

(e) While a dual-purpose leveling and protecting clear coating is made on top of the metallic paint coat, these two paint films may be combined as the ground coating 12.

(f) Design patterns and text characters may be printed by pad printing or screen printing onto the ground coating 12, or within the ground coating 12 between the metallic paint coating and the clear paint coating. In this case, the way in which the patterns and characters can be seen through the metal film layer 13 having the half-mirroring effect varies depending on the angle, which further improves the decorativeness.

Figure 4:
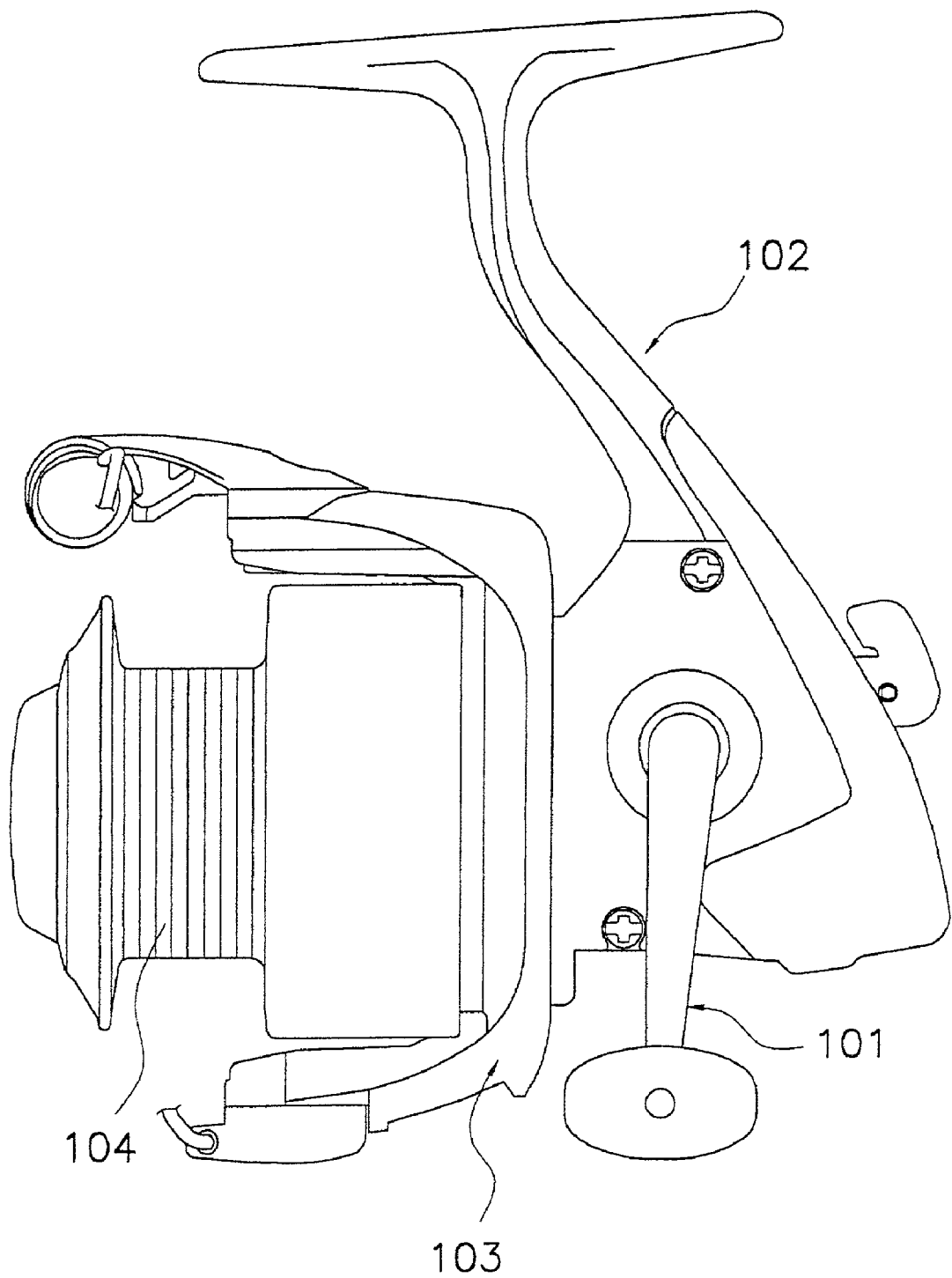
FIG. 4 is a side view of a spinning reel in accordance with another embodiment of the present invention.

(g) In the aforementioned embodiments, a dual-bearing reel is discussed as an example of fishing reels. However, as seen in FIG. 4, the present invention can be applied to a spinning reel as another example of fishing reels. In FIG. 4, the spinning reel has a reel main body 102 that is attachable to the fishing rod, a handle assembly 101 that is rotatably attached to a side of the reel main body 102, a rotor 103, and a line-winding spool 104. The rotor 103 is rotatably attached to the front portion of the reel 102. The fishing line can be wound about the outer periphery of the spool 104. The spool 104 is disposed at a front portion of the rotor 103. The spool 104 is attached to the reel main body 102 so as to be movable reciprocatingly front and back. The reel main body 102 of the spinning reel has a surface structure shown in FIG. 3.

Additionally, the surface structure of the present invention shown in FIG. 3 can be applied to the rotor or the spool of a dual-bearing reel or a spinning reel, as well as to its reel member.

Effects of Invention

With the present invention, in a certain position the light reflected by the ground coating shows the tone of the paint, while in another position the light reflected by the metal film layer due to the mirroring effect shows a metallic mirrored surface, without depriving of the hue of the ground coating. Accordingly, the ground coating thereby yields iridescent patterns, while the metal film layer yields a metallic mirrored surface at the same time, improving the appearance of the design.

What is claimed is:

1. A fishing reel, comprising:
    a reel body, including
        a component body,
        a ground film-layer formed by a paint coat on an obverse-layer side of said component body, and
        metal film means for providing a mirroring effect, said metal film means being formed semitransparently on an obverse-layer side of said ground film-layer;
    a handle assembly disposed on a side of said reel body; and
    a line-winding spool removably and reattachably fitted to said reel body.

2. The fishing reel as set forth in claim 1, wherein
    said fishing reel is a spinning reel and further comprises a rotor rotatably fitted to said reel body, and
    said spool can move reciprocatingly with respect to said reel body.

3. The fishing reel as set forth in claim 1, wherein
    said fishing reel is a dual bearing reel, and
    said spool is rotatably fitted to said reel body.

4. The fishing reel as set forth in claim 1, wherein
    said metal film means is formed by metal vapor deposition, and contains any one of chrome, nickel, zinc, magnesium, aluminum, a stainless steel alloy, and titanium.

5. The fishing reel as set forth in claim 1, further comprising
    a protective film layer formed by a clear paint coat on an obverse-layer side of said metal film means.

6. A fishing reel, comprising:
    a reel body, including
        a component body,
        a ground film-layer formed by a paint coat on an obverse-layer side of said component body, and
        metal film means for providing a mirroring effect, said metal film means being formed semitransparently on an obverse-layer side of said ground film-layer;
    a handle assembly disposed on a side of said reel body;
    a line-winding spool removably and reattachably fitted to said reel body; and
    an anodized film layer formed in between said component body and ground film-layer by anodizing,
    said component body of said reel being formed from at least one of aluminum alloy and magnesium alloy.

* * * * *